(12) United States Patent
Suzuki et al.

(10) Patent No.: US 11,085,499 B2
(45) Date of Patent: Aug. 10, 2021

(54) CALIPER BODY AND DISC BRAKE

(71) Applicant: Hitachi Automotive Systems, Ltd., Ibaraki (JP)

(72) Inventors: Shinji Suzuki, Minami-alps (JP); Takayuki Kinoshita, Nakakoma-gun (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 52 days.

(21) Appl. No.: 16/625,872

(22) PCT Filed: May 18, 2018

(86) PCT No.: PCT/JP2018/019297
§ 371 (c)(1),
(2) Date: Dec. 23, 2019

(87) PCT Pub. No.: WO2019/003707
PCT Pub. Date: Jan. 3, 2019

(65) Prior Publication Data
US 2020/0124121 A1    Apr. 23, 2020

(30) Foreign Application Priority Data

Jun. 28, 2017   (JP) .............................. JP2017-126340

(51) Int. Cl.
| | | |
|---|---|---|
| *F16D 65/00* | (2006.01) | |
| *F16D 55/2265* | (2006.01) | |
| *F16D 55/00* | (2006.01) | |
| *F16D 121/04* | (2012.01) | |

(52) U.S. Cl.
CPC ..... *F16D 65/0068* (2013.01); *F16D 55/2265* (2013.01); *F16D 2055/0016* (2013.01); *F16D 2121/04* (2013.01); *F16D 2250/0007* (2013.01)

(58) Field of Classification Search
CPC .......................... F16D 55/2265; F16D 65/0068
USPC ....... 188/71.1, 72.2, 72.4, 72.5, 73.3, 73.39, 188/369, 370; D12/180
See application file for complete search history.

(56) References Cited

U.S. PATENT DOCUMENTS

| | | | | |
|---|---|---|---|---|
| D700,551 S | * | 3/2014 | Davenport, III | .............. D12/180 |
| 2005/0258008 A1 | * | 11/2005 | King | ....................... F16D 65/00 188/264 R |
| 2015/0233438 A1 | * | 8/2015 | Atsuta | ................. F16D 65/0068 188/73.31 |

FOREIGN PATENT DOCUMENTS

JP          2003-14011 A       1/2003

OTHER PUBLICATIONS

International Search Report of PCT/JP2018/019297 dated Jul. 17, 2018.
Written Opinion of PCT/JP2018/019297 dated Jul. 17, 2018.

* cited by examiner

*Primary Examiner* — Christopher P Schwartz
(74) *Attorney, Agent, or Firm* — Mattingly & Malur, P.C.

(57) ABSTRACT

This caliper body includes a cylinder portion (26) that has a piston disposed therein and is internally provided with a liquid pressure chamber, a bleeder boss portion (29) that communicates with the liquid pressure chamber and includes a bleeder hole configured to discharge air from the liquid pressure chamber, and a plurality of identifiers (112 and 116). At least one identifier (112) of the identifier (112 and 116) is formed in a region hidden by a bleeder plug (131) attached to the bleeder boss portion (29).

7 Claims, 10 Drawing Sheets

CALIPER BODY AND DISC BRAKE

TECHNICAL FIELD

The present invention relates to a caliper body and a disk brake. Priority is claimed on Japanese Patent Application No. 2017-126340, filed Jun. 28, 2017, the content of which is incorporated herein by reference.

BACKGROUND ART

There are disk brakes in which an identifier is provided in a caliper body (for example, refer to Patent Document 1).

PRIOR ART DOCUMENT

Patent Document

Patent Document 1

Japanese Unexamined Patent Application, First Publication No. 2003-14011

SUMMARY OF INVENTION

Problems to be Solved by the Invention

Improvement in quality of a caliper body and a disk brake is required.

An object of the present invention is to provide a caliper body and a disk brake in which quality can be improved.

Solution to Problem

In order to achieve the foregoing object, according to the present invention, there is provided a caliper body including a cylinder portion that has a piston disposed therein and is internally provided with a liquid pressure chamber, a bleeder boss portion that communicates with the liquid pressure chamber and includes a bleeder hole configured to discharge air from the liquid pressure chamber, and a plurality of identifiers. At least one identifier of the plurality of identifiers is formed in a region hidden by a bleeder plug attached to the bleeder boss portion.

Advantageous Effects of Invention

According to the caliper body and the disk brake described above, it is possible to improve the quality of a caliper body and a disk brake.

DESCRIPTION OF EMBODIMENT

Figure 1:
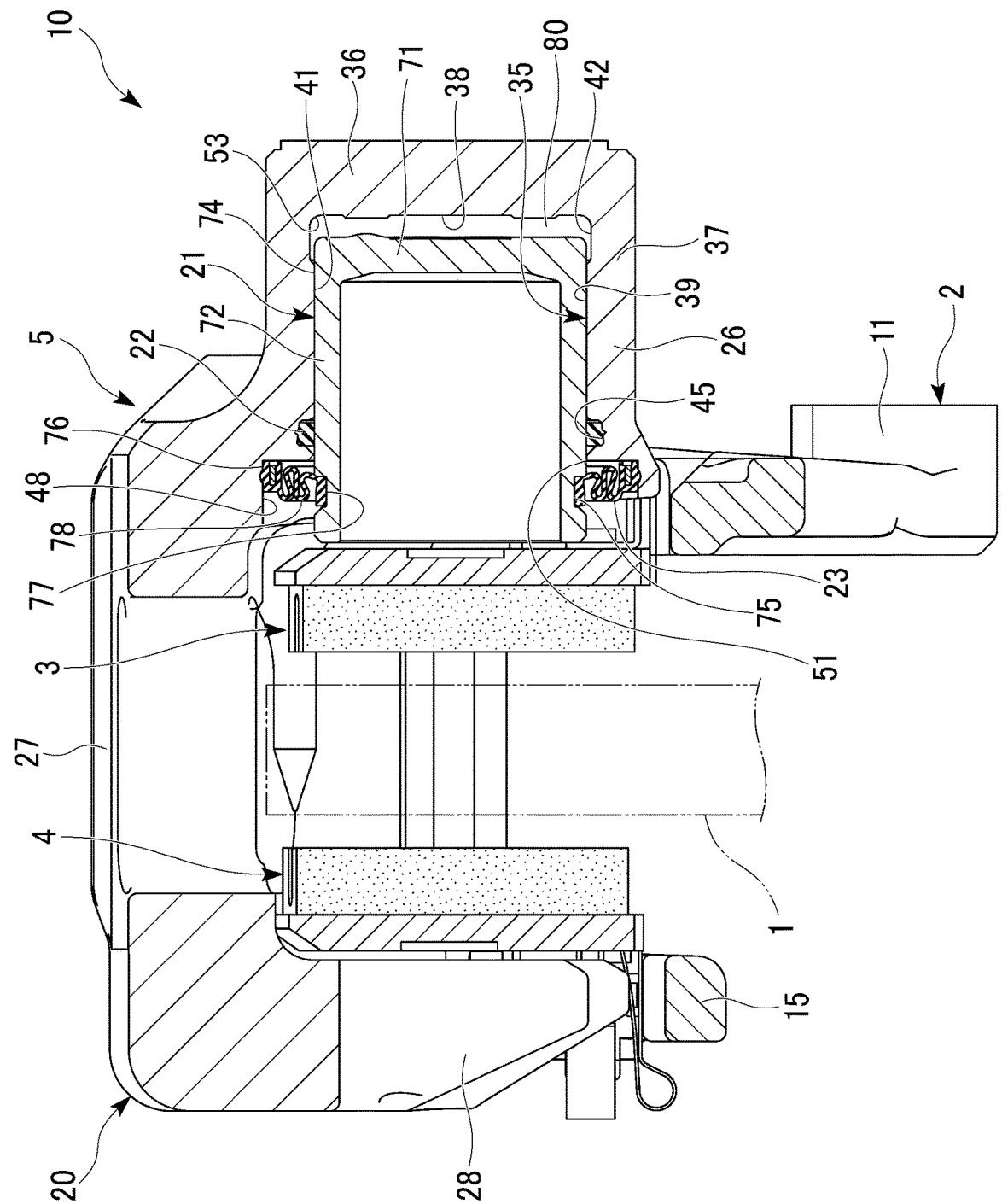
FIG. 1 is a view illustrating a disk brake according to the present embodiment and is a cross-sectional view viewed from a side surface side.

An embodiment of the present invention will be described below with reference to the drawings.

A disk brake 10 according to the present embodiment is provided for vehicles such as automobiles and applies a braking force to a vehicle. Specifically, the disk brake 10 is a disk brake for braking a front wheel of four-wheeled vehicles. The disk brake 10 causes a vehicle to brake by stopping rotation of a circular plate-shaped disk 1 which rotates together with a wheel (not illustrated). Hereinafter, a direction of a central axis of the disk 1 will be referred to as a disk axial direction, a radial direction of the disk 1 will be referred to as a disk radial direction, and a rotation direction (circumferential direction) of the disk will be referred to as a disk rotation direction. In the drawings, as an example, FIGS. 1 to 4 and 7 to 10 illustrate the disk brake 10 to be attached to the right side of a vehicle body (which will hereinafter be referred to as a vehicle body right side) when viewed in a moving direction while the vehicle travels forward.

The disk brake 10 includes a support member 2, a pair of pads 3 and 4, and a caliper 5. The support member 2 is disposed to straddle an outer circumferential side of the disk 1 and is fixed to a non-rotation portion of the vehicle.

Figure 2:
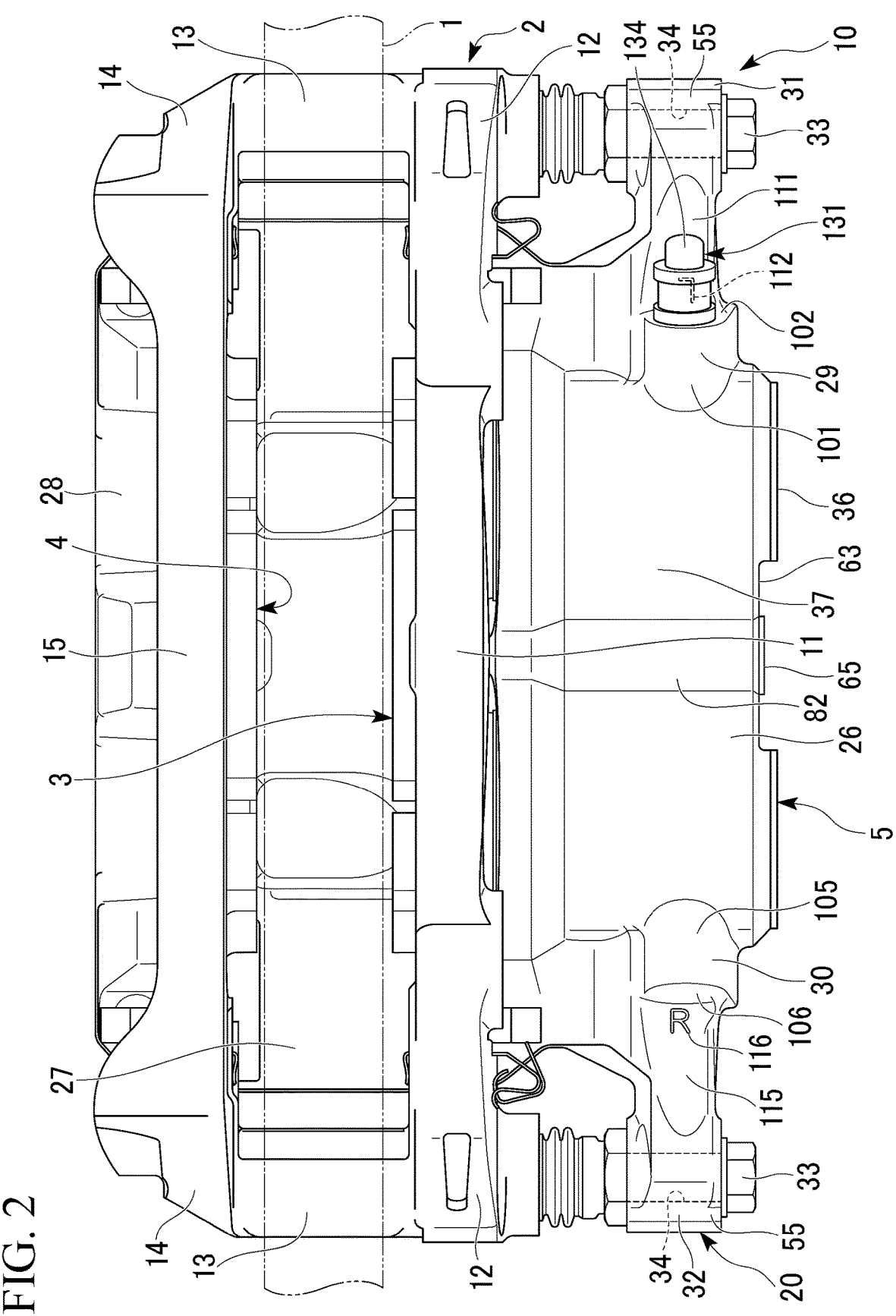
FIG. 2 is a bottom view illustrating the disk brake according to the present embodiment.

As illustrated in FIG. 2, the support member 2 has an attachment base portion 11, a pair of inner side torque receiving portions 12, a pair of pin support portions 13, a pair of outer side torque receiving portions 14, and an outer beam 15.

Figure 3:
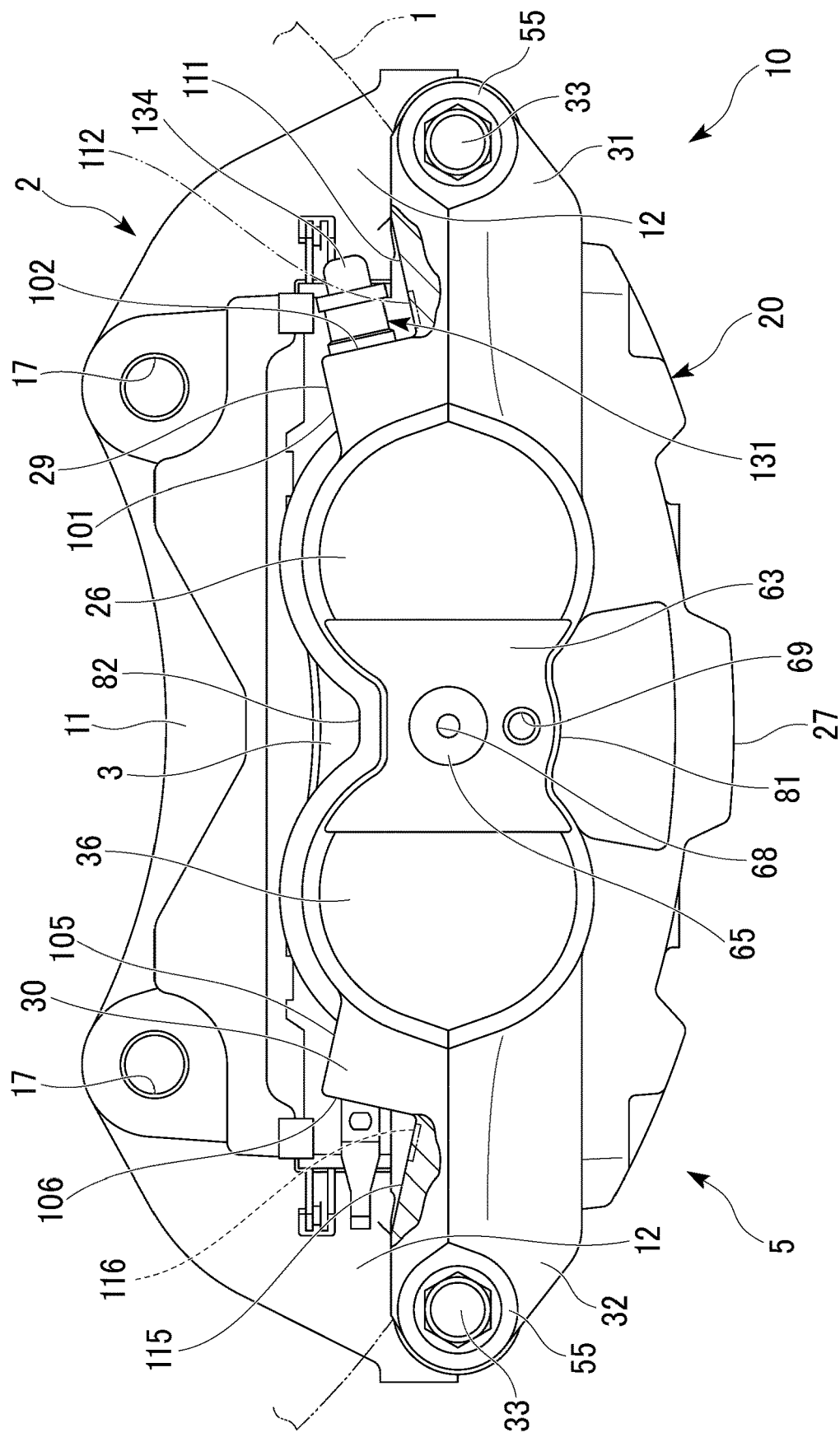
FIG. 3 is a rear view illustrating the disk brake according to the present embodiment.
Figure 4:
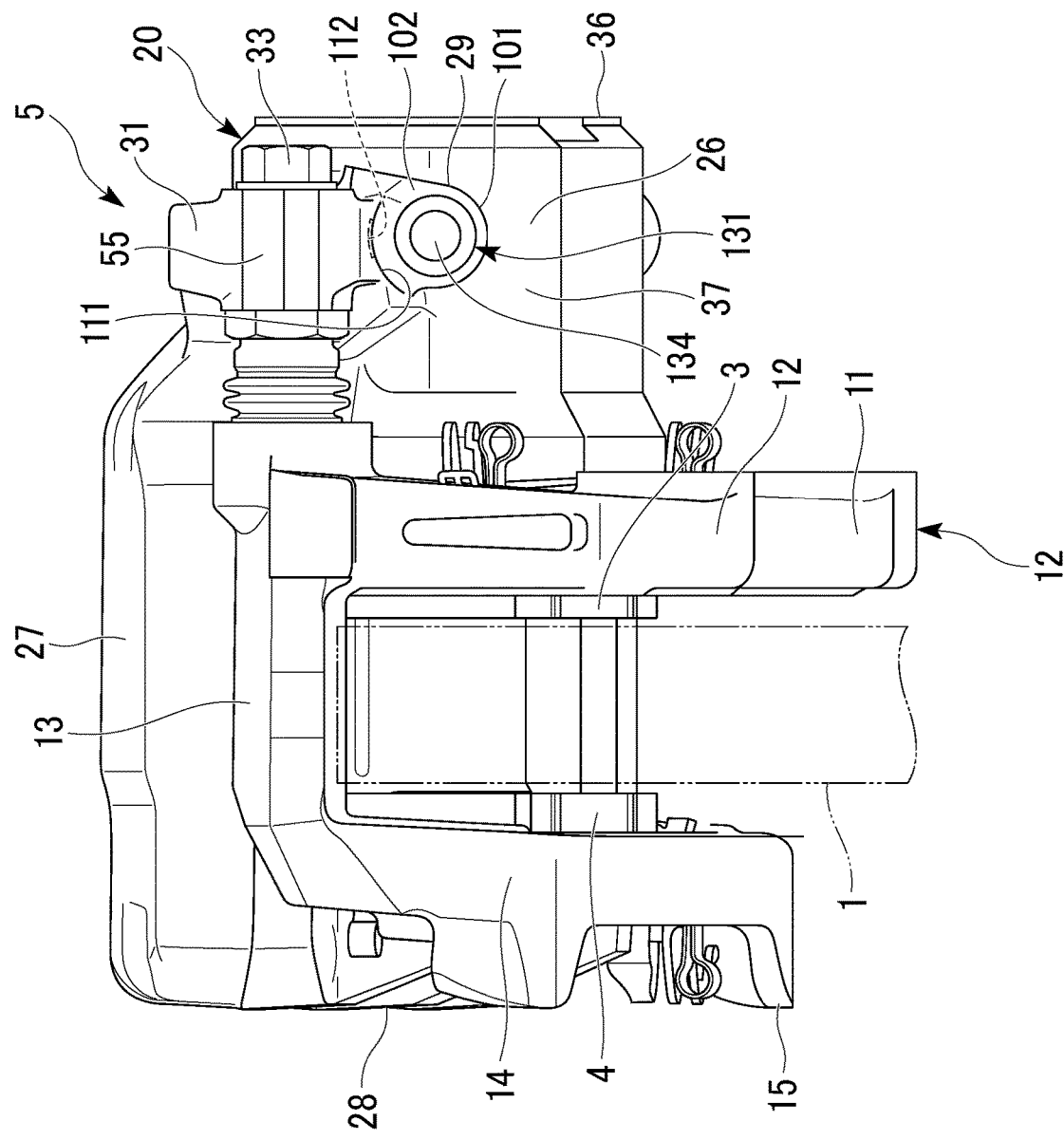
FIG. 4 is a side view illustrating the disk brake according to the present embodiment.

The attachment base portion 11 is disposed on one side (inner side of the vehicle in a vehicle width direction) of the disk 1 in the disk axial direction so as to extend in the disk rotation direction. The attachment base portion 11 is fixed to a non-rotation portion of the vehicle through a pair of attachment holes 17 on both sides in the disk rotation direction, as illustrated in FIG. 3. The pair of inner side torque receiving portions 12 extend outward in the disk radial direction (direction away from a center of the disk 1) from both end portions of the attachment base portion 11 in the disk rotation direction. FIG. 4 illustrates only one of the pair of pin support portions 13. As illustrated in FIG. 4, the pair of pin support portions 13 extend to the other side (outer side of the vehicle in the vehicle width direction) in the disk axial direction so as to straddle the outer circumferential side of the disk 1 from end portions of the pair of inner side torque receiving portions 12 on an outer side in the disk radial direction. FIG. 4 illustrates only one of the pair of outer side torque receiving portions 14. As illustrated in FIG. 4, the pair of outer side torque receiving portions 14 extend inward in the disk radial direction (direction approaching the center of the disk 1) from end portions of the pair of pin support portions 13 in the disk axial direction on a side opposite to the pair of inner side torque receiving portions 12. As illustrated in FIG. 2, the outer beam 15 extends in the disk rotation direction and joins inner sides of the pair of outer side torque receiving portions 14 in the disk radial direction to each other.

In the pair of pads 3, both end portions of a first pad 3 in the disk rotation direction are supported by the pair of inner side torque receiving portions 12, and both end portions of a second pad 4 in the disk rotation direction are supported by the pair of outer side torque receiving portions 14. The pair of pads 3 and 4 are supported by the support member 2 so as to be movable in the disk axial direction and are disposed to face both respective surfaces of the disk 1. The caliper 5 is supported by the pair of pin support portions 13 of the support member 2 so as to be movable in the disk axial direction. The caliper 5 clamps the pair of pads 3 and 4 and presses the pads to both surfaces of the disk 1.

As illustrated in FIG. 1, the caliper 5 includes a caliper body 20, a piston 21, a piston seal 22, and a piston boot 23.

Figure 5:
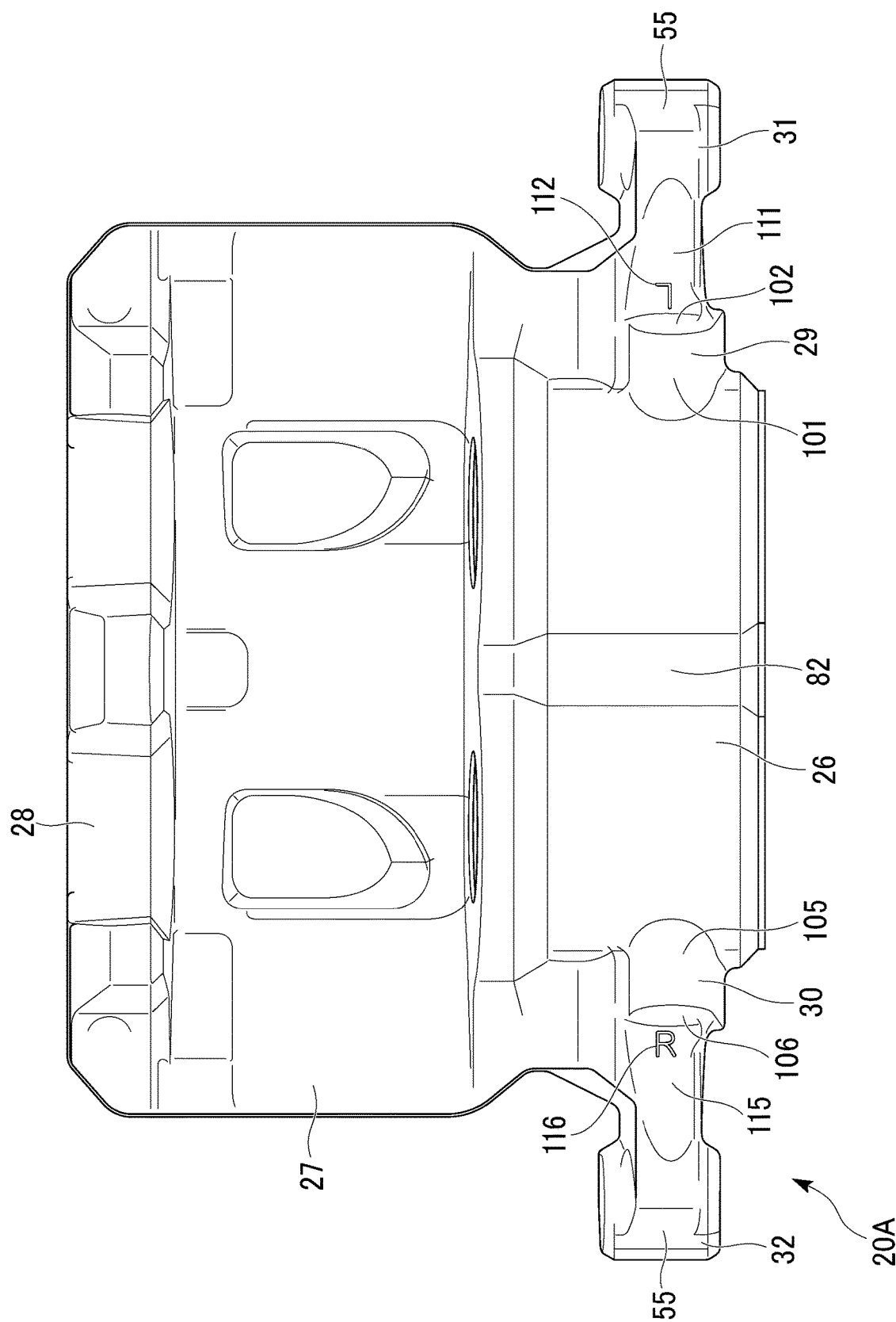
FIG. 5 is a bottom view illustrating a casting raw material of a caliper body of the disk brake according to the present embodiment.
Figure 6:
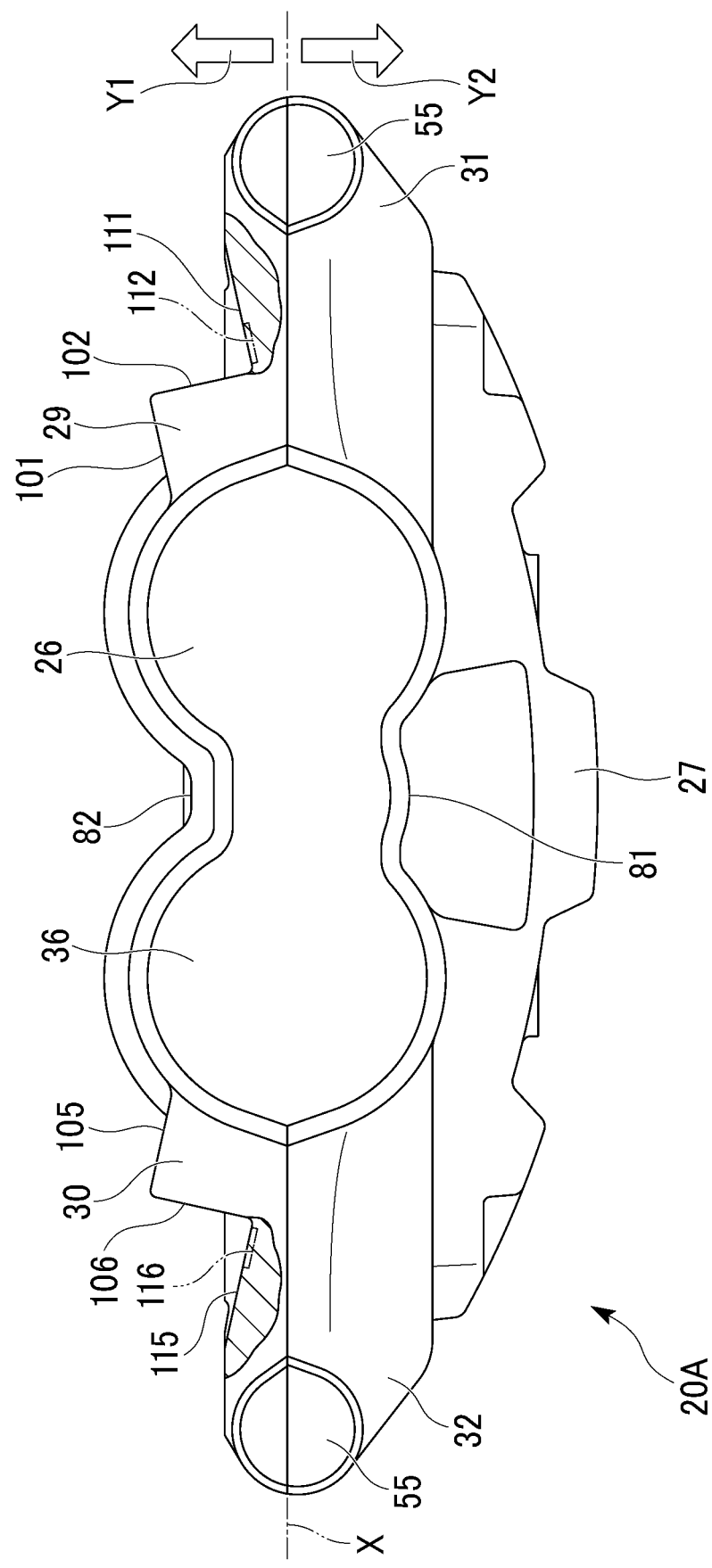
FIG. 6 is a rear view illustrating the casting raw material of the caliper body of the disk brake according to the present embodiment.

The caliper body 20 is formed by machining a casting raw material 20A integrally formed through casting as illustrated in FIGS. 5 and 6. Specifically, the caliper body 20 is formed of an aluminum alloy.

The caliper body 20 can also be made of cast iron. As illustrated in FIG. 1, the caliper body 20 has a cylinder portion 26, a bridge portion 27, and a claw portion 28. The cylinder portion 26 is positioned on one side of the disk 1 in the disk axial direction. The bridge portion 27 extends in the disk axial direction so as to straddle an outer circumference of the disk 1 from an outer side of the cylinder portion 26 in the disk radial direction. The claw portion 28 extends to the inner side in the disk radial direction from a side of the bridge portion 27 opposite to the cylinder portion 26 and is positioned on the other side of the disk 1 in the disk axial direction.

In addition, as illustrated in FIG. 3, the caliper body 20 has a pair of bleeder boss portions 29 and 30 and a pair of pin attachment portions 31 and 32. The pair of bleeder boss portions 29 and 30 are formed to protrude outward in the disk rotation direction from an inner side part of the cylinder portion 26 in the disk radial direction. The pair of pin attachment portions 31 and 32 extend to both sides in the disk rotation direction from an intermediate part and the outer side part of the cylinder portion 26 in the disk radial direction. The pair of bleeder boss portions 29 and 30 are disposed at positions at equal distances from the center of the disk 1 and are positionally aligned with each other in the disk radial direction. The pair of pin attachment portions 31 and 32 are also disposed at positions at equal distances from the center of the disk 1 and positionally aligned with each other in the disk radial direction.

A first pin attachment portion 31 of the pair of pin attachment portions 31 and 32 is adjacent to an outer side of a first bleeder boss portion 29 of the pair of bleeder boss portions 29 and 30 in the disk radial direction and is connected thereto. The first pin attachment portion 31 protrudes outward in the disk rotation direction than the first bleeder boss portion 29 from the outer side of the first bleeder boss portion 29 in the disk radial direction. A second pin attachment portion 32 of the pair of pin attachment portions 31 and 32 is adjacent to an outer side of a second bleeder boss portion 30 of the pair of bleeder boss portions 29 and 30 in the disk radial direction and is connected thereto. The second pin attachment portion 32 protrudes outward in the disk rotation direction than the second bleeder boss portion 30 from the outer side of the second bleeder boss portion 30 in the disk radial direction. As illustrated in FIG. 2, the pair of bleeder boss portions 29 and 30 and the pair of pin attachment portions 31 and 32 are positionally aligned with each other in the disk axial direction.

In other words, as illustrated in FIG. 3, the caliper body 20 has the pair of bleeder boss portions 29 and 30 at inner sides of the pair of pin attachment portions 31 and 32 in the disk radial direction, the pair of bleeder boss portions 29 and 30 protrudes to both sides in the disk rotation direction from the cylinder portion 26. The bleeder boss portions 29 and 30 protrude to the inner side in the disk radial direction and both sides in the disk rotation direction from places in the vicinity of boundaries between the respective pin attachment portions 31 and 32 and the cylinder portion 26 on the inner side in the disk radial direction.

The first bleeder boss portion 29 protrudes inward in the disk radial direction from the cylinder portion 26 side of the first pin attachment portion 31. The first bleeder boss portion 29 protrudes to a side opposite to the second pin attachment portion 32 in the disk rotation direction from the first pin attachment portion 31 side of the cylinder portion 26 in the disk rotation direction and the inner side in the disk radial direction. The second bleeder boss portion 30 protrudes inward in the disk radial direction from the cylinder portion 26 side of the second pin attachment portion 32. The second bleeder boss portion 30 protrudes to a side opposite to the first pin attachment portion 31 in the disk rotation direction from the second pin attachment portion 32 side of the cylinder portion 26 in the disk rotation direction and inward in the disk radial direction.

As illustrated in FIG. 2, the caliper body 20 is movably supported by the support member 2 using a pair of slide pins 33. The pair of slide pins 33 are attached to pin boss portions 55 which are respective outer parts of the pair of pin attachment portions 31 and 32 in the disk rotation direction.

A pin insertion hole 34 into which the slide pin 33 is inserted in the disk axial direction is formed to penetrate each of the pin boss portions 55 of the pair of pin attachment portions 31 and 32. In the pair of pin boss portions 55, both end surfaces of each pin boss portion 55 in the disk axial direction and the pin insertion hole 34 are formed through cutting. The pair of pin attachment portions 31 and 32 are formed through casting using dies of the casting raw material 20A of the caliper body 20 illustrated in FIG. 5, except for the pin boss portions 55 including the pin insertion holes 34 formed through machining. In the support member 2 illustrated in FIG. 2, a pin hole (not illustrated) is formed in each of the pair of pin support portions 13 in the disk axial direction.

The pair of slide pins 33 extending from the pair of pin attachment portions 31 and 32 in the disk axial direction are slidably fitted into the pin holes (not illustrated) of the pair of pin support portions 13. Accordingly, the caliper 5 is supported by the pair of pin support portions 13 of the support member 2 using the pair of slide pins 33 so as to be slidable in the disk axial direction.

As illustrated in FIG. 1, cylinder bores 35 are formed in the cylinder portion 26. One end of the cylinder bore 35 opens toward the claw portion 28 side, and the cylinder bore 35 is recessed toward a side opposite to the disk 1 in the disk axial direction. In the cylinder portion 26, a plurality of, specifically two cylinder bores 35 are provided. The plurality of cylinder bores 35 have the same shape and are provided side by side in the disk rotation direction while being positionally aligned in the disk axial direction and the disk radial direction and positionally shifted in the disk rotation direction.

Due to the plurality of cylinder bores 35 formed therein, the cylinder portion 26 has a cylinder bottom portion 36 including inner bottom surfaces 38 of the plurality of cylinder bores 35 on a side opposite to the claw portion 28, and the cylinder portion 26 has a cylinder body portion 37 extending to the claw portion 28 side from the cylinder bottom portion 36 and including wall surfaces 39 of the plurality of cylinder bores 35.

The piston 21 is disposed in each of the cylinder bores 35 so as to be movable in the disk axial direction. The wall surface 39 of the cylinder bore 35 has an inner circumferential guide surface 41 which is a cylindrical surface for guiding movement of the piston 21. The wall surface 39 of the cylinder bore 35 has a toric large-diameter groove 42 on the cylinder bottom portion 36 side of the inner circumferential guide surface 41. The large-diameter groove 42 is recessed outward in the radial direction than the inner circumferential guide surface 41. A groove bottom diameter of the large-diameter groove 42 is larger than the diameter of the inner circumferential guide surface 41. The large-diameter groove 42 is disposed in an end portion on the wall surface 39 of the cylinder bore 35 on the cylinder bottom portion 36 side. The wall surface 39 of the cylinder bore 35 has a toric piston seal groove 45 at an intermediate position of the inner circumferential guide surface 41 on a side opposite to the cylinder bottom portion 36. The piston seal groove 45 is recessed outward in the radial direction than the inner circumferential guide surface 41. The groove bottom diameter of the piston seal groove 45 is larger than the diameter of the inner circumferential guide surface 41.

A toric boot fitting hole 48 is formed on the cylinder portion 26 at the claw portion 28 side than the cylinder bore 35. The boot fitting hole 48 is recessed outward in the radial direction than the inner circumferential guide surface 41 of the cylinder bore 35. The boot fitting hole 48 is formed at a position in the end portion of the cylinder portion 26 on the claw portion 28 side. An inner diameter of the boot fitting hole 48 is larger than the diameter of the inner circumferential guide surface 41 of the cylinder bore 35. The inner diameter of the boot fitting hole 48 is larger than the inner diameter of the cylinder bore 35 at any position. An opening portion 51 of the cylinder bore 35 opens in a bottom portion of the boot fitting hole 48. The inner circumferential guide surface 41, the large-diameter groove 42, and the piston seal groove 45 on the wall surface 39 of the cylinder bore 35 are disposed in the cylinder body portion 37 of the cylinder portion 26. The cylinder bore 35 has the inner bottom surface 38 on a side of the large-diameter groove 42 opposite to the inner circumferential guide surface 41.

The large-diameter groove 42 is formed through casting using the dies of the casting raw material 20A of the caliper body 20. The inner circumferential guide surface 41, the piston seal groove 45, and the boot fitting hole 48 are formed by cutting the casting raw material 20A of the caliper body 20.

As illustrated in FIGS. 2 and 3, an outer bottom surface 63 expanding orthogonal to a central axis of the cylinder bore 35 is formed on a side of the cylinder bottom portion 36 of the cylinder portion 26 opposite to the claw portion 28. As illustrated in FIG. 3, a seat portion 65 protruding toward a side opposite to the claw portion 28 in the disk axial direction than the outer bottom surface 63 is provided in the middle on the outer bottom surface 63 in the disk rotation direction. An interlocking hole 69 is formed on an outer side of the seat portion 65 in the disk radial direction. The interlocking hole 69 is recessed toward the claw portion 28 side of the outer bottom surface 63 in the disk axial direction. A piping hole 68 is formed in the cylinder bottom portion 36. The piping hole 68 extends toward the claw portion 28 side in the disk axial direction from the middle on a tip surface of the seat portion 65. The seat portion 65, the piping hole 68, and the interlocking hole 69 are provided at middle positions in the disk rotation direction in the caliper body 20.

Figure 7:
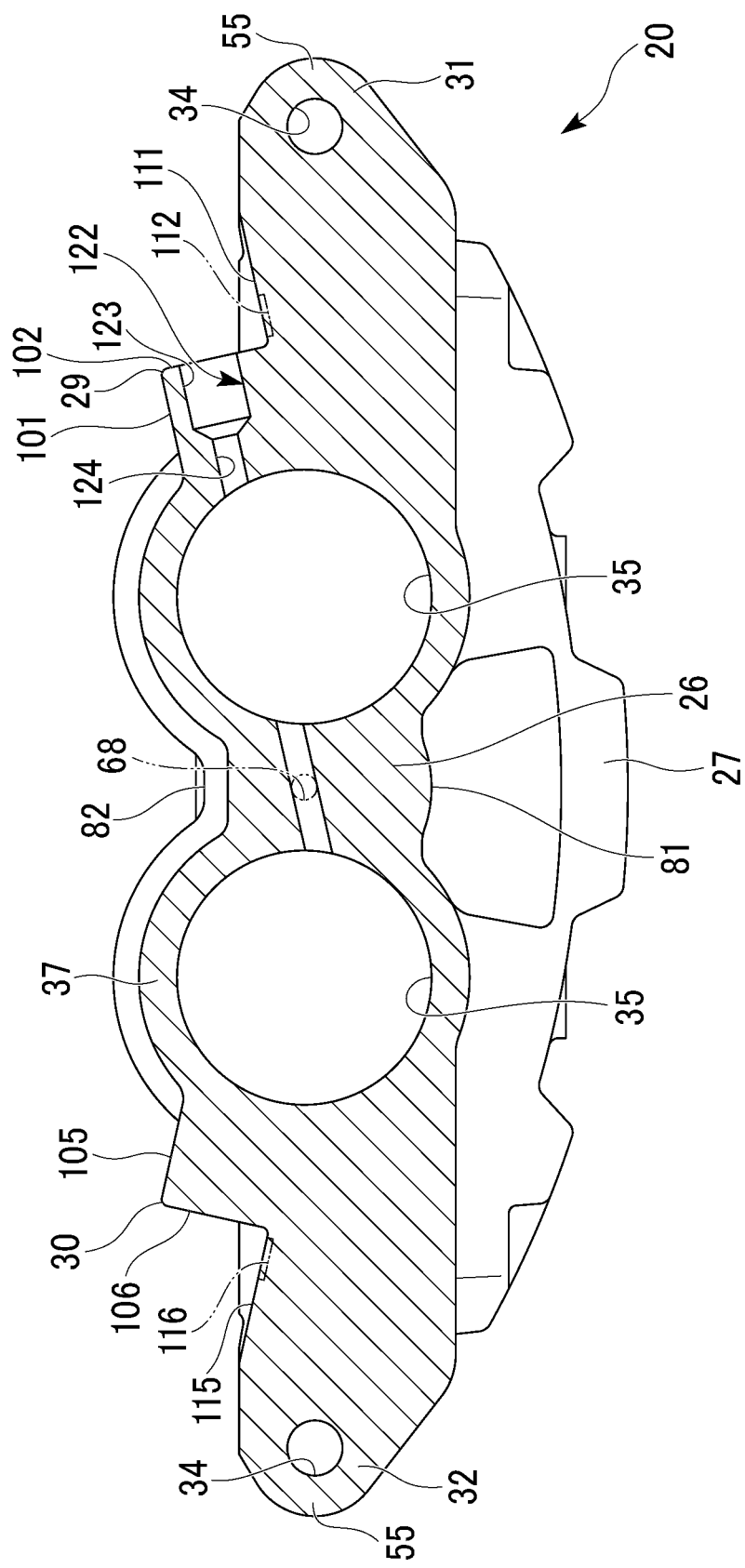
FIG. 7 is a view illustrating the caliper body of the disk brake according to the present embodiment and is a cross-sectional view viewed from a rear surface side.

As illustrated in FIG. 7, the piping hole 68 is parallel to the plurality of cylinder bores 35. The piping hole is disposed on a line connecting the central axes of the plurality of cylinder bores 35, and is disposed at a middle position between the plurality of cylinder bores 35. The piping hole 68 in the disk rotation direction is not positionally aligned with any of the plurality of cylinder bores 35. A straight line connecting central axes of the pin insertion holes 34 of the pair of respective pin attachment portions 31 and 32 is parallel to a straight line connecting central axes of the pair of cylinder bores 35 and is shifted slightly to the outer side in the disk radial direction from a straight line connecting the central axes of the pair of cylinder bores 35.

As illustrated in FIG. 1, the piston 21 includes a circular plate-shaped piston bottom portion 71 and a cylindrical piston body portion 72. The piston 21 is formed to have a bottomed cylinder shape having an open end portion of the piston body portion 72 on a side opposite to the piston bottom portion 71. In the piston body portion 72, a toric interlocking groove 75 recessed inward in the radial direction than an outer diameter surface 74 constituted of a cylindrical surface is formed on a side of the piston body portion 72 opposite to the piston bottom portion 71 in the axial direction. The piston 21 is accommodated in the cylinder bore 35 in a posture in which the piston bottom portion 71 is positioned on the cylinder bottom portion 36 side inside the cylinder bore 35. In this state, an open tip on the claw portion 28 side protrudes to the claw portion 28 side than the cylinder bore 35. The interlocking groove 75 is formed on the piston 21. The interlocking groove protrudes toward the tip side than the cylinder bore 35 in this manner.

The piston seal 22 is fitted into the piston seal groove 45 of the cylinder bore 35. The piston 21 is fitted on an inner circumferential side of the piston seal 22. The piston seal 22 seals a gap between the cylinder portion 26 and the piston 21, and the piston 21 is supported by the piston seal 22 and the inner circumferential guide surface 41 of the cylinder bore 35 so as to be movable in the disk axial direction.

The piston boot 23 has an annular large-diameter fitting portion 76 fitted into the boot fitting hole 48 of the cylinder portion 26, an annular small-diameter fitting portion 77 fitted into the interlocking groove 75 of the piston 21, and a bellows portion 78 which can extend and contract between the large-diameter fitting portion and the small-diameter fitting portion. Since the piston boot 23 covers an outer circumferential portion, where is a portion of the cylinder bore 35 side than the interlocking groove 75 and exposed from the cylinder portion 26, of the piston 21, an intermediate part, which is not fixed to the cylinder portion 26 and the piston 21, of the bellows portion 78 extends and contracts in accordance with movement of the piston 21 with respect to the cylinder portion 26.

Here, a space surrounded by the cylinder bottom portion 36 of the cylinder portion 26, parts of the cylinder body portion 37 on the cylinder bottom portion 36 side, and the piston 21 fitted into the cylinder bore 35 constitutes a liquid pressure chamber 80. A liquid pressure chamber 80 is configured such that a hydraulic fluid is supplied to and discharged from the liquid pressure chamber 80. A plurality of, specifically two, cylinder bores 35 are provided side by side in the disk rotation direction. As a result, a plurality of, specifically two liquid pressure chambers 80 are also provided side by side in the disk rotation direction. The cylinder portion 26 has the piston 21 disposed therein and is internally provided with the liquid pressure chamber 80.

As illustrated in FIG. 3, in the cylinder portion 26, a recessed portion 81 recessed inward in the disk radial direction than an outer end position in the disk radial direction is formed in the middle in the disk rotation direction on the outer side in the disk radial direction. In addition, in the cylinder portion 26, a recessed portion 82 recessed outward in the disk radial direction than an inner end position in the disk radial direction is formed in the middle in the disk rotation direction on the inner side in the disk radial direction as well. In the cylinder portion 26, the outer bottom surface 63, the seat portion 65, the piping hole 68, and the interlocking hole 69 are formed through cutting with respect to the casting raw material 20A of the caliper body 20 illustrated in FIG. 6. Except for the outer bottom surface 63, the seat portion 65, the piping hole 68, and the interlocking hole 69, an outer side part including the recessed portions 81 and 82 is formed through casting using the dies of the casting raw material 20A of the caliper body 20.

The first bleeder boss portion 29 has a half-tubular surface 101 having a half-cylindrical surface shape on the inner side in the disk radial direction as illustrated in FIG. 4 and has a flat end surface 102 on the outer side in the disk rotation direction as illustrated in FIG. 3. On the half-tubular surface 101, a central axis of the half-tubular surface 101 and the end portion on the inner side in the disk radial direction extending parallel to this central axis are laid along one straight line connecting the respective central axes of the pair of cylinder bores 35 and the piping hole 68 illustrated in FIG. 7. The half-tubular surface 101 is slightly inclined with respect to this straight line away to the inner side in the disk radial direction as it goes to the outer side in the disk rotation direction. In other words, on the half-tubular surface 101, the central axis of the half-tubular surface 101 and the end portion on the inner side in the disk radial direction are laid along one straight line connecting the central axes of the pair of pin insertion holes 34. The half-tubular surface 101 is slightly inclined with respect to this straight line away to the inner side in the disk radial direction as it goes to the outer side in the disk rotation direction. The end surface 102 expands orthogonal to the central axis of the half-tubular surface 101. In the first bleeder boss portion 29, the half-tubular surface 101 and the end surface 102 are formed through casting using the dies of the casting raw material 20A of the caliper body 20 illustrated in FIG. 6.

Similar to the first bleeder boss portion 29, the second bleeder boss portion 30 has a half-tubular surface 105 on the inner side in the disk radial direction and has a flat end surface 106 on the outer side in the disk rotation direction. The half-tubular surface 105 has a half-cylindrical surface shape. On the half-tubular surface 105, a central axis of the half-tubular surface 105 and the end portion on the inner side in the disk radial direction extending parallel to this central axis are laid along one straight line connecting the respective central axes of the pair of cylinder bores 35 and the piping hole 68 illustrated in FIG. 7. The half-tubular surface 105 is slightly inclined with respect to this straight line away to the inner side in the disk radial direction as it goes to the outer side in the disk rotation direction. In other words, on the half-tubular surface 105, the central axis of the half-tubular surface 105 and the end portion on the inner side in the disk radial direction are laid along one straight line connecting the central axes of the pair of pin insertion holes 34. The half-tubular surface 105 is inclined with respect to this straight line away to the inner side in the disk radial direction as it goes to the outer side in the disk rotation direction. The end surface 106 is orthogonal to the central axis of the half-tubular surface 105. Thus, each of the end surfaces 102 and 106 of the bleeder boss portions 29 and 30 is inclined such that the distance of a line connecting the respective central axes of the pair of cylinder bores 35 and the piping hole 68 in an extending direction decreases as it goes to the inner side in the disk radial direction. The half-tubular surface 105 and the end surface 106 are formed through casting using the dies of the casting raw material 20A of the caliper body 20 illustrated in FIG. 6.

As illustrated in FIG. 4, a marking surface 111 (surface) constituting a recessed surface shape which is the shape of a portion of the cylindrical surface is formed in the first pin attachment portion 31. The marking surface 111 is formed on the inner side in the disk radial direction on the outer side in the disk rotation direction of the first bleeder boss portion 29 positionally aligned with the first pin attachment portion 31 in the disk rotation direction. On the marking surface 111, as illustrated in FIG. 7, a central axis of the marking surface 111 and the end portion on the outer side in the disk radial direction extending parallel to the central axis are laid along one straight line connecting the respective central axes of the pair of cylinder bores 35 and the piping hole 68. The marking surface 111 is slightly inclined with respect to the straight line away to the inner side in the disk radial direction as it goes to the outer side in the disk rotation direction. In other words, on the marking surface 111, the central axis of the marking surface 111 and the end portion on the outer side in the disk radial direction are laid along one straight line connecting the central axes of the pair of pin insertion holes 34. The marking surface 111 is slightly inclined with respect to the straight line away to the inner side in the disk radial direction as it goes to the outer side in the disk rotation direction.

The marking surface 111 expands so as to be substantially orthogonal to a straight line along the disk radial direction and passing through the central axis of the disk and the marking surface 111. As illustrated in FIG. 3, an identifier 112 is formed on the marking surface 111 to be recessed than the marking surface 111. In other words, the identifier 112 is formed on the marking surface 111 of the first pin attachment portion 31 on the inner side in the disk radial direction. The identifier 112 is formed in the vicinity of the end surface 102 on the marking surface 111. Here, the identifier 112 indicates an attachment position in a vehicle. Specifically, as illustrated in FIG. 2, a character "L" indicating a member to be attached to the left side of the vehicle body (which will hereinafter be referred to as a vehicle body left side) when viewed in the moving direction while the vehicle travels forward is formed in the identifier 112.

Similar to the first pin attachment portion 31, a marking surface 115 (surface) constituting a recessed surface shape which is the shape of a portion of the cylindrical surface is formed in the second pin attachment portion 32. The marking surface 115 is formed on the inner side in the disk radial direction on the outer side in the disk rotation direction of the second bleeder boss portion 30 positionally aligned with the second pin attachment portion 32 in the disk rotation direction. On the marking surface 115, as illustrated in FIG. 7, a central axis of the marking surface 115 and the end portion on the outer side in the disk radial direction extending parallel to the central axis are laid along one straight line connecting the respective central axes of the pair of cylinder bores 35 and the piping hole 68. The marking surface 115 is slightly inclined with respect to the straight line away to the inner side in the disk radial direction as it goes to the outer side in the disk rotation direction. In other words, on the marking surface 115, the central axis of the marking surface 115 and the end portion on the outer side in the disk radial direction are laid along one straight line connecting the central axes of the pair of pin insertion holes 34. The marking surface 115 is slightly inclined with respect to the straight line away to the inner side in the disk radial direction as it goes to the outer side in the disk rotation direction. The marking surface 115 expands so as to be substantially orthogonal to a straight line along the disk radial direction and passing through the central axis of the disk 1 and the marking surface 115.

As illustrated in FIG. 3, an identifier 116 is formed on the marking surface 115 so as to be recessed than the marking surface 115. In other words, the identifier 116 is formed on the marking surface 115 of the second pin attachment portion 32 on the inner side in the disk radial direction. The identifier 116 is formed in the vicinity of the end surface 106 on the marking surface 115. Here, the identifier 116 indicates an attachment position in a vehicle. Specifically, as illustrated in FIG. 2, a character "R" indicating a member to be attached to the vehicle body right side is formed in the identifier 116. Thus, the caliper body 20 includes a plurality of, specifically two identifiers 112 and 116.

The casting raw material 20A of the caliper body 20 illustrated in FIGS. 5 and 6 is subjected to casting using dies. The casting raw material 20A of the caliper body 20 has a mirror symmetrical shape in the disk rotation direction, except for the identifiers 112 and 116 constituted of characters different from each other. The casting raw material 20A of the caliper body 20 is constituted such that it can be attached to any of the vehicle body left side and the vehicle body right side. That is, the casting raw material 20A of the caliper body 20 is a common component shared by both a member to be attached to the vehicle body left side and a member to be attached to the vehicle body right side, which have the same shape. As a result, the dies for forming the casting raw material 20A of the caliper body 20 are shared as both dies for casting the casting raw material 20A of the caliper body 20 to be attached to the vehicle body left side and dies for casting the casting raw material 20A of the caliper body 20 to be attached to the vehicle body right side. Accordingly, die costs for the dies can be reduced.

As illustrated in FIG. 5, the marking surfaces 111 and 115 and the identifiers 112 and 116 of the pair of pin attachment portions 31 and 32 are formed in a state of having casting surfaces at the time of casting the casting raw material 20A of the caliper body 20. Thus, the identifiers 112 and 116 are casting characters formed through casting. The half-tubular surfaces 101 and 105 and the end surfaces 102 and 106 of the pair of bleeder boss portions 29 and 30 are also formed in a state of having casting surfaces at the time of casting the casting raw material 20A.

The dies used when the casting raw material 20A is cast is disposed such that, a plane including the respective central axes of the plurality of cylinder bores 35, and a straight line connecting these central axes are disposed in a die split surface X illustrated in FIG. 6. In the casting raw material 20A, a portion of an inner side of the die split surface X in the disk radial direction is formed using a first die, and a portion of an outer side of the die split surface X in the disk radial direction is formed using a second die.

In the first die, a direction inward in the disk radial direction indicated by the arrow Y1 in FIG. 6 becomes a die split direction. In the second die, a direction outward in the disk radial direction indicated by the arrow Y2 in FIG. 6 becomes the die split direction. The marking surfaces 111 and 115 and the identifiers 112 and 116 of the pair of pin attachment portions 31 and 32 expand substantially orthogonal to the die split direction. Thus, the marking surfaces 111 and 115 and the identifiers 112 and 116 of the pair of pin attachment portions 31 and 32 are favorably cast using the first die and are formed on a projection surface in a casting direction of the first die, that is, the die split direction of the first die. The half-tubular surfaces 101 and 105 and the end surfaces 102 and 106 of the pair of bleeder boss portions 29 and 30 are also cast using the first die. The end surfaces 102 and 106 are slightly inclined with respect to the die split direction of the dies and expand in the die split direction of the dies.

Here, in the case of the disk brake 10 to be attached to the vehicle body right side, as illustrated in FIG. 7, one straight bleeder hole 122 is formed in the cylinder portion 26. The bleeder hole 122 is formed to penetrate the cylinder bore 35 on a side closer to the first bleeder boss portion 29 from the first bleeder boss portion 29, penetrate the piping hole 68, and extend linearly to the cylinder bore 35 on a side far from the first bleeder boss portion 29. The bleeder hole 122 has a screw hole 123 which is disposed in the first bleeder boss portion 29 and opens on the end surface 102, and a small-diameter hole 124 which penetrates the piping hole 68 and allows one cylinder bore 35 and another cylinder bore 35 to communicate with each other. The bleeder hole 122 extends along the marking surface 111 of the first pin attachment portion 31 of the pair of pin attachment portions 31 and 32 on a side closer to the first bleeder boss portion 29.

That is, the bleeder hole 122 is formed as one straight hole which penetrates one cylinder bore 35 of the plurality of cylinder bores 35 and extends to another cylinder bore 35. The screw hole 123 has a larger inner diameter than the small-diameter hole 124. The bleeder hole 122 is disposed such that a central axis of the bleeder hole 122 is disposed in a plane orthogonal to the central axis of the cylinder bore 35. The bleeder hole 122 is formed by performing boring of the small-diameter hole 124 and a lower hole of the screw hole 123 using a drill and further performing screw-threading of the screw hole 123 thereafter.

A bleeder plug 131 illustrated in FIGS. 2 to 4 is screwed into the screw hole 123 and is attached to the first bleeder boss portion 29. The bleeder plug 131 has a tubular plug main body 132 illustrated in FIGS. 8 to 10 and a plug cap 134 illustrated in FIGS. 2 to 4. A plug main body 132 is screwed into the screw hole 123. The plug cap 134 is attachable to and detachable from the plug main body 132. The plug cap 134 is put on the plug main body 132, covers the plug main body 132, and blocks an external opening of the plug main body 132. In the case of the disk brake 10 to be attached to the vehicle body right side, the bleeder plug 131 is laid along the marking surface 111 on an inner side of the first pin attachment portion 31 of the pair of pin attachment portions 31 and 32 in the disk radial direction on a side closer to the first bleeder boss portion 29 to which the bleeder plug 131 is attached.

In the case of the disk brake 10 to be attached to the vehicle body right side, as illustrated in FIG. 2, the identifier 112 marked with "L", which is one of the plurality of identifiers 112 and 116 provided in the caliper body 20, is formed in a region hidden by the plug cap 134 of the bleeder plug 131 attached to the first bleeder boss portion 29, as illustrated in FIGS. 2 to 4.

In other words, regarding the identifier 112, as illustrated in FIGS. 2 and 3, in the axial direction of the bleeder plug 131 attached to the first bleeder boss portion 29, the entire identifier 112 and the plug cap 134 of the bleeder plug 131 are positionally aligned with each other. As illustrated in FIGS. 2 and 4, the identifier 112 is also positionally aligned with the bleeder plug 131 in the radial direction along the marking surface 111. As illustrated in FIGS. 3 and 4, the identifier 112 is disposed in the vicinity of the plug cap 134.

Moreover, in other words, regarding the identifier 112, as illustrated in FIGS. 2 and 3, the entire identifier 112 and the plug cap 134 of the bleeder plug 131 are positionally aligned with each other in the disk rotation direction and are positionally aligned with each other in the disk axial direction, as illustrated in FIGS. 2 and 4. As illustrated in FIGS. 3 and 4, the identifier 112 faces the bleeder plug 131 at hand in the disk radial direction.

Moreover, in other words, as illustrated in FIG. 2, when the caliper body 20 is viewed from a side of the bleeder plug 131 opposite to the marking surface 111, that is, viewed from the center side of the disk 1, the identifier 112 overlaps the projection surface of the bleeder plug 131 attached to the first bleeder boss portion 29 in the disk radial direction.

Figure 8:
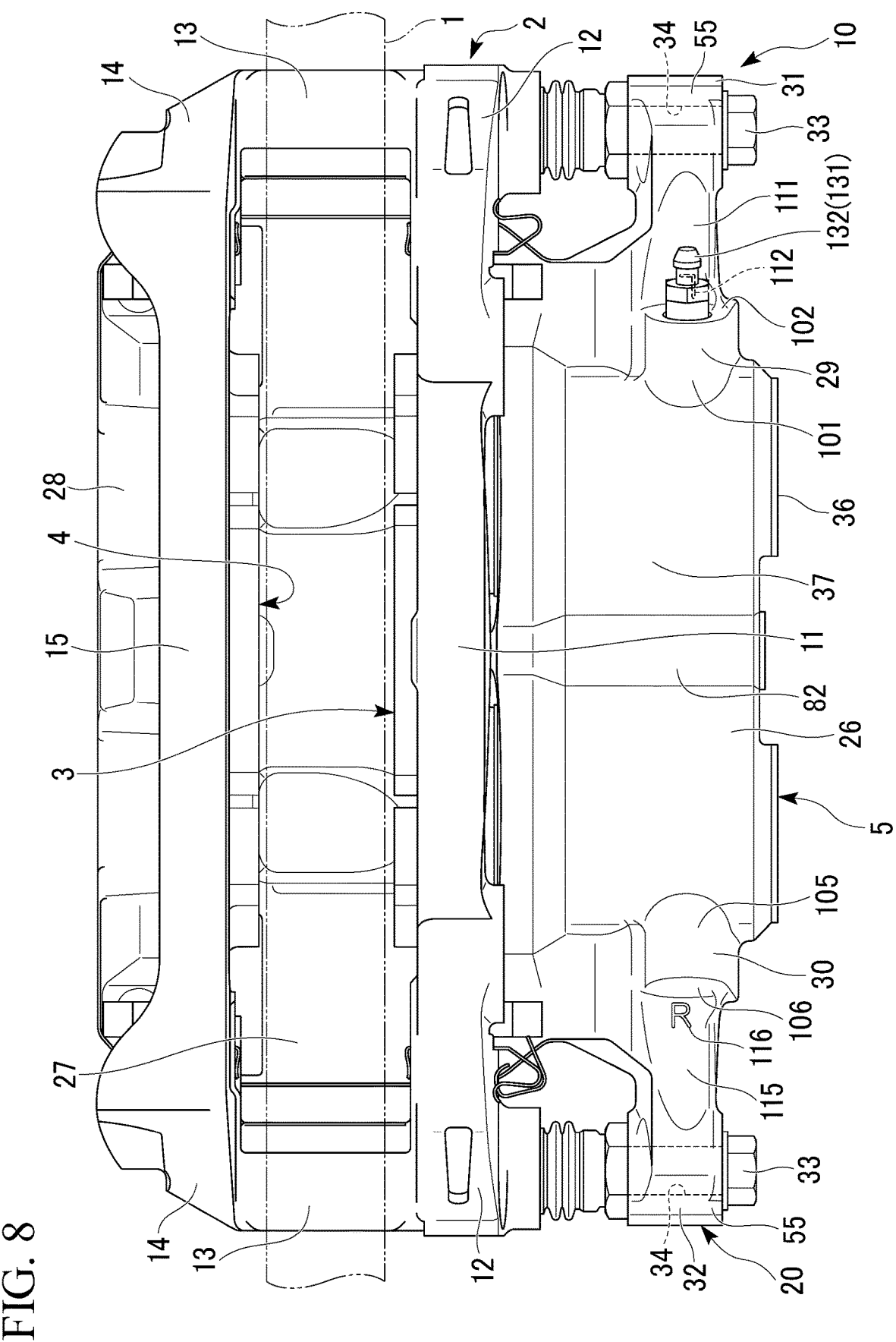
FIG. 8 is a bottom view illustrating a state where a bleeder cap is removed in the disk brake according to the present embodiment.

As illustrated in FIG. 8, the identifier 112 is also formed in the region hidden by the plug main body 132 attached to the first bleeder boss portion 29 in a state where the plug cap 134 is removed from the plug main body 132.

Figure 9:
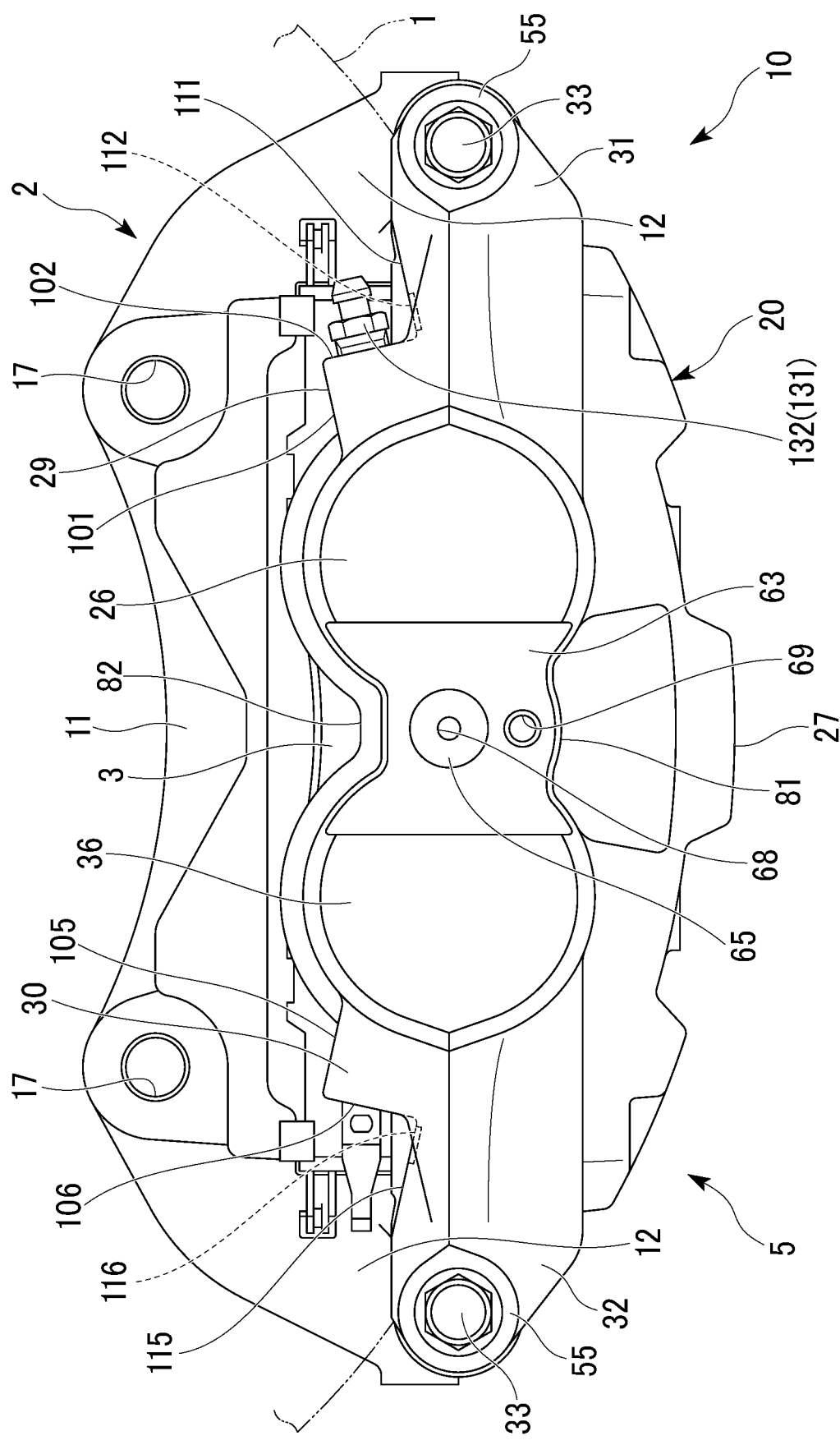
FIG. 9 is a rear view illustrating a state where the bleeder cap is removed in the disk brake according to the present embodiment.
Figure 10:
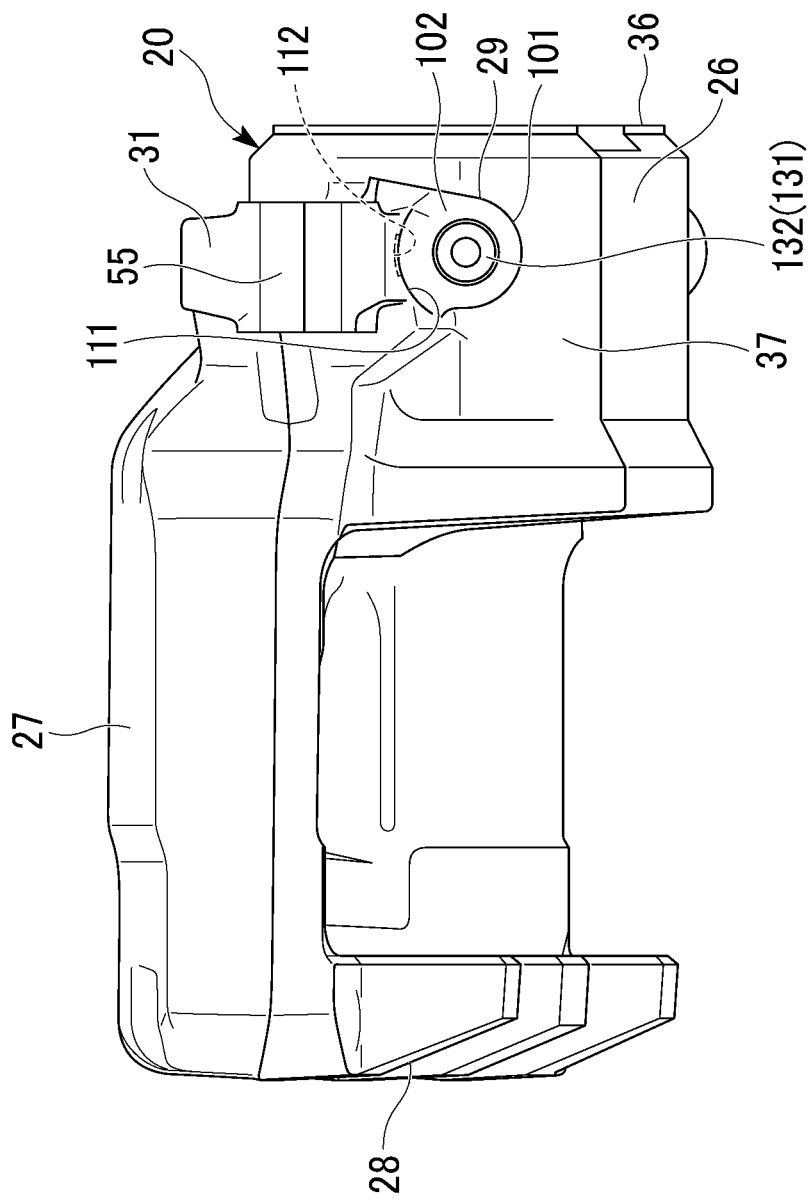
FIG. 10 is a side view illustrating the caliper body and a plug main body of the disk brake according to the present embodiment.

In other words, as illustrated in FIGS. 8 and 9, the identifier 112 and the plug main body 132 attached to the first bleeder boss portion 29 are positionally aligned with each other in the axial direction of the plug main body 132, and as illustrated in FIGS. 8 and 10, the identifier 112 is also positionally aligned with the plug main body 132 in the radial direction along the marking surface 111. As illustrated in FIGS. 9 and 10, the identifier 112 is disposed in the vicinity of the plug main body 132.

Moreover, in other words, as illustrated in FIGS. 8 and 9, the identifier 112 and the plug main body 132 are positionally aligned with each other in the disk rotation direction, and as illustrated in FIGS. 8 and 10, the identifier 112 is also positionally aligned in the disk axial direction. As illustrated in FIGS. 9 and 10, the identifier 112 faces and is close to the plug main body 132 in the disk radial direction.

Moreover, in other words, as illustrated in FIG. 8, when the caliper body 20 is viewed from a side of the plug main body 132 opposite to the marking surface 111, that is, viewed from the center side of the disk 1, the identifier 112 overlaps the projection surface of the plug main body 132 attached to the first bleeder boss portion 29 in the disk radial direction.

Here, in the case of the disk brake 10 to be attached to the vehicle body right side, in the caliper 5, when viewed from a side inward in the disk radial direction, that is, a side where the identifiers 112 and 116 are provided, as described above, the identifier 112 marked with "L" is hidden by both of the plug cap 134 of the bleeder plug 131 attached to the first bleeder boss portion 29 and the plug main body 132 in a state where the plug cap 134 is removed. In contrast, the identifier 116 of "R" indicating the right side which is the attachment position in the vehicle is not hidden by any of the plug cap 134 of the bleeder plug 131 and the plug main body 132 in a state where the plug cap 134 is removed. Accordingly, a worker can see the identifier 116 of "R" when the caliper 5 is viewed from a side inward in the disk radial direction, so that the worker identifies that it is the caliper 5 to be attached to the vehicle body right side.

As illustrated in FIG. 10, after machining ends, the plug main body 132 is attached to the caliper body 20 first, before other components are assembled. As a result, thereafter, when the piston 21, the piston seal 22, the piston boot 23, and the slide pin 33 are assembled in the caliper body 20, a worker sees the caliper body 20 from a side inward in the disk radial direction and confirms the identifier 116 of "R" which he/she has seen, so that the worker can identify that it is the caliper body 20 for the caliper 5 to be attached to the vehicle body right side.

Since the pistons 21 illustrated in FIG. 1 are inserted into a plurality of, specifically two respective cylinder bores 35, a plurality of, specifically two liquid pressure chambers 80 are formed. The small-diameter hole 124 of the bleeder hole 122 illustrated in FIG. 7 allows these two liquid pressure chambers 80 to communicate with each other.

In a brake piping (not illustrated), a locking hook is engaged with the interlocking hole 69 of the caliper body 20 illustrated in FIG. 3, so that the brake piping is connected to the piping hole 68 in a state where the brake piping detents with respect to the caliper body 20. Further, a hydraulic fluid supplied to and discharged from the piping hole 68 through the brake piping is supplied to and discharged from a plurality of, specifically two liquid pressure chambers 80 via the small-diameter hole 124 of the bleeder hole 122.

Here, at the time of filling of a hydraulic fluid, the two liquid pressure chambers 80 are filled with a hydraulic fluid via the piping hole 68 in a state where the disk brake 10 is attached to a vehicle. At this time, the disk brake 10 discharges air pushed out from the inside due to the filled hydraulic fluid and air incorporated into the hydraulic fluid to the outside air from the liquid pressure chambers 80 via the bleeder hole 122 and the plug main body 132 in a state where the plug cap 134 of the bleeder plug 131 is detached. In other words, the first bleeder boss portion 29 includes the bleeder hole 122 which communicates with the liquid pressure chambers 80 and discharges air from the liquid pressure chambers 80.

In the case of the disk brake 10 to be attached to the vehicle body right side, for bleeding as described above, when the disk brake 10 is attached to the vehicle, the caliper 5 including the caliper body 20 is attached in a posture in which the screw hole 123 and the bleeder plug 131 provided in the first bleeder boss portion 29 positioned above the small-diameter hole 124 in the vertical direction. In other words, in a state of being attached to a vehicle, the caliper 5 is disposed such that the first bleeder boss portion 29, of the pair of bleeder boss portions 29 and 30, to which the bleeder plug 131 is attached to be positioned above the second bleeder boss portion 30 in the vertical direction. Moreover, in other words, in a state of being attached to a vehicle, the caliper 5 is disposed such that the first pin attachment portion 31 on a side closer to the first bleeder boss portion 29, of the pair of pin attachment portions 31 and 32, in which the bleeder plug 131 is disposed to be positioned above the second pin attachment portion 32 in the vertical direction.

The bleeder hole 122 is drilled from only one side of the bleeder boss portions 29 and 30 in accordance with the attachment position of the disk brake 10 in the vehicle. That is, in the case of the disk brake 10 to be attached to the vehicle body right side, as described above, one straight bleeder hole 122 is formed in the caliper body 20 from the first bleeder boss portion 29, and no bleeder hole is formed in the second bleeder boss portion 30.

On the other hand, contrary to that described above, in the case of the disk brake 10 to be attached to the vehicle body left side, one straight bleeder hole 122 penetrating the cylinder bore 35 on a side closer to the second bleeder boss portion 30 from the second bleeder boss portion 30, penetrating the piping hole 68, and extending to the cylinder bore 35 on a side far from the second bleeder boss portion 30 is formed in the caliper body 20, and the bleeder plug 131 is attached to the screw hole 123. In this case, the bleeder hole 122 extends along the marking surface 115 of the second pin attachment portion 32 of the pair of pin attachment portions 31 and 32 on a side closer to the second bleeder boss portion 30. In addition, no bleeder hole is formed in the first bleeder boss portion 29.

In the case of the disk brake 10 to be attached to the vehicle body left side, in the caliper body 20, the other identifier 116, of the identifiers 112 and 116, stated with "R" is formed in a region hidden by the bleeder plug 131 attached to the second bleeder boss portion 30. In other words, similar to the disk brake 10 to be attached to the vehicle body right side, the identifier 116 is positionally aligned with the plug cap 134 of the bleeder plug 131 attached to the second bleeder boss portion 30 and the plug main body 132 in a state where the plug cap 134 is removed in the disk rotation direction and is also positionally aligned therewith in the disk axial direction, so that the identifier 116 faces and is close to the plug cap 134 and the plug main body 132 in the disk radial direction.

In this manner, in the case of the disk brake 10 to be attached to the vehicle body left side, the caliper 5 is attached in a posture in which the screw hole 123 and the bleeder plug 131 which are provided in the second bleeder boss portion 30 to be positioned above the small-diameter hole 124 in the vertical direction. In other words, in a state of being attached to a vehicle, the second bleeder boss portion 30, of the pair of bleeder boss portions 29 and 30, to which the bleeder plug 131 is attached is disposed above the first bleeder boss portion 29 in the vertical direction. Moreover, in other words, in a state of being attached to a vehicle, the second pin attachment portion 32, of the pair of pin attachment portions 31 and 32, on a side closer to the second bleeder boss portion 30 to which the bleeder plug 131 is attached is dispose above the first pin attachment portion 31 in the vertical direction.

In the disk brake 10, a hydraulic fluid is introduced into the piping hole 68 via a brake piping (not illustrated). Consequently, a hydraulic fluid is introduced into the two liquid pressure chambers 80, which are formed between the two cylinder bores 35 in the caliper body 20 and the pistons 21 inserted into the two respective cylinder bores 35, through the inside of the small-diameter hole 124 from the piping hole 68. Consequently, in each of the two liquid pressure chambers 80, a brake pressure acts on the piston 21. As a result, both the pistons 21 move forward to the disk 1 side and press the first pads 3 disposed between both the pistons 21 and the disk 1 toward the disk 1. Accordingly, the first pads 3 move and come into contact with the disk 1. In addition, due to a reaction force of this pressing, the caliper body 20 moves, and the claw portion 28 presses the second pad 4 disposed between the claw portion 28 and the disk 1 toward the disk 1. Accordingly, the second pad 4 comes into contact with the disk 1. In this manner, due to operation of a plurality of pistons 21, the caliper 5 clamps the pair of pads 3 and 4 from both sides with the pistons 21 and the claw portion 28 and presses the pair of pads 3 and 4 to both surfaces of the disk 1. As a result, the caliper 5 applies frictional resistance to the disk 1 and generates a braking force.

In a disk brake disclosed in Patent Document 1, an identifier is provided in a caliper body. In such a disk brake, for example, a casting raw material of a caliper body is shared by both the left and the right. At the time of casting, an identifier indicating that this is to be attached to the vehicle body left side and an identifier indicating that this is to be attached to the vehicle body right side are formed through casting. In machining performed thereafter, a necessary identifier remains, and an unnecessary identifier is removed. In this case, in a caliper body, if an identifier is formed through casting at a position for an attachment hole to which a bleeder plug is attached, when an attachment hole is formed through cutting using a drill, an unnecessary identifier can also be cut and removed together. However, when an identifier is cut, since a tool performs intermittent cutting, there is a possibility of deterioration in machining accuracy of the attachment hole and deterioration in life-span of the tool.

In contrast, regarding the caliper body 20 according to the present embodiment and the disk brake 10 including the caliper body 20, the caliper body 20 includes the plurality of identifiers 112 and 116, and a plurality of identifiers 112 and 116 are formed in regions hidden by the bleeder plugs 131 attached to the bleeder boss portions 29 and 30. Accordingly, when the bleeder plug 131 is attached to one of the bleeder boss portions 29 and 30 and one of the identifiers 112 and 116 is hidden by the bleeder plug 131 such that the identifier is difficult to be visually recognized, the remaining identifier which is not hidden by the bleeder plug 131 and is easy to be visually recognized indicates the attachment position in the vehicle for the disk brake 10 including the caliper body 20. Thus, it is no longer necessary to remove an unnecessary identifier, so that it is suppress deterioration in an accuracy products due to machining an unnecessary identifier, specifically deterioration in accuracy of the bleeder hole 122 is suppressed, and deterioration in life-span of a machining tool for machining the bleeder hole 122 is suppressed. Therefore, quality of the caliper body 20 and the disk brake 10 including the caliper body 20 can be improved, and machining costs can be reduced.

The bleeder boss portions 29 and 30 of the caliper body 20 according to the present embodiment have shapes formed to protrude outward in the disk rotation direction from the inner side of the cylinder portion 26 in the disk radial direction, and the bleeder hole 122 is drilled from the end surfaces 102 and 106 of the bleeder boss portions 29 and 30. As a result, surfaces which can be cut at the same time as cutting of the bleeder hole 122 are the end surfaces 102 and 106. Here, in general, in the case of the casting raw material 20A of the caliper body 20 of a first type having the cylinder portion 26, the bridge portion 27, and the claw portion 28, due to the shape thereof, the die split direction of the dies at the time of casting is set outward and inward in the disk radial direction as described above. In such a die split direction, it is extremely difficult to form the identifiers 112 and 116 on the end surfaces 102 and 106 expanding substantially along the die split direction. In contrast, in the present embodiment, one unnecessary identifier of the plurality of identifiers 112 and 116 is formed in the region hidden by the bleeder plug 131 as described above, so that it is not necessary to cut and remove the identifier. As a result, it is no longer necessary to form the identifiers 112 and 116 on the end surfaces 102 and 106. Therefore, the identifiers 112 and 116 can be easily cast.

The caliper body 20 according to the present embodiment includes the pair of pin attachment portions 31 and 32 that protrude outward in the disk rotation direction from the outer sides of the bleeder boss portions 29 and 30 in the disk radial direction and have the pin insertion hole 34 which is formed in the pin boss portion 55 on the outer side in the disk rotation direction and into which the slide pin 33 is inserted in the disk axial direction. In the caliper body 20 according to the present embodiment, the identifiers 112 and 116 are formed on the marking surfaces 111 and 115 on the inner sides of the pair of pin attachment portions 31 and 32 in the disk radial direction. Thus, when the die split direction of the dies is set outward and inward in the disk radial direction, the identifiers 112 and 116 can be formed favorably through casting.

In the caliper body 20 according to the present embodiment, the identifiers 112 and 116 are formed through casting. Therefore, machining costs and product costs can be suppressed.

In the caliper body 20 according to the present embodiment, the identifiers 112 and 116 are formed on the projection surfaces in the die split direction, that is, the casting direction. Therefore, the identifiers 112 and 116 can be formed favorably through casting.

The identifiers 112 and 116 indicate the attachment positions of the caliper body 20 and the disk brake 10 in the vehicle. Therefore, a worker can easily recognize the attachment positions in the vehicle.

In the present embodiment, a constitution in which two identifiers 112 and 116 are formed has been described as an example. However, a constitution in which three or more identifiers 112 and 116 are formed may be adopted. At least one identifier of a plurality of identifiers which have been formed in this manner need only be formed in a region hidden by the bleeder plug attached to the bleeder boss portion.

The caliper body according to a first aspect described above is a caliper body of a disk brake. The caliper body includes a cylinder portion that has a piston disposed therein and is internally provided with a liquid pressure chamber, and a bleeder boss portion that communicates with the liquid pressure chamber and includes a bleeder hole configured to discharge air from the liquid pressure chamber. The caliper body includes a plurality of identifiers. At least one identifier of these identifiers is formed in a region hidden by a bleeder plug attached to the bleeder boss portion. Accordingly, quality can be improved.

In the caliper body according to a second aspect, in the first aspect, the bleeder boss portion is formed to protrude outward in a disk rotation direction from an inner side of the cylinder portion in a disk radial direction. Accordingly, a shape suitable for die splitting of the caliper body having the cylinder portion, the bridge portion, and the claw portion is achieved.

In the caliper body according to a third aspect, the second aspect includes a pair of pin attachment portions that protrude outward in the disk rotation direction from outer sides of the bleeder boss portions in the disk radial direction and have a pin insertion hole which is formed in a portion of an outer side in the disk rotation direction and into which a slide pin is inserted in a disk axial direction. The identifiers are formed on surfaces on inner sides of the pair of pin attachment portions in the disk radial direction. Thus, when the die split direction of the dies is set outward and inward in the disk radial direction, the identifiers can be formed favorably through casting.

In the caliper body according to a fourth aspect, in any one of the first to third aspects, the identifiers are formed through casting. Therefore, machining costs and product costs can be suppressed.

In the caliper body according to a fifth aspect, in any one of the first to fourth aspects, the identifiers are formed on projection surfaces in a casting direction. Therefore, the identifiers can be formed favorably through casting.

A disk brake according to a sixth aspect includes the caliper body according to any one of the first to fifth aspects. Accordingly, quality of the disk brake can be improved.

In the disk brake according to a seventh aspect, in the sixth aspect, the identifiers indicate attachment positions in a vehicle. Therefore, a worker can easily recognize the attachment positions in a vehicle.

Hereinabove, an embodiment of the present invention has been described in detail with reference to the drawings. However, a specific constitution is not limited to this embodiment, and the embodiment also includes design changes and the like within a range not departing from the gist of the present invention. In addition, the constituent elements described above in the embodiment can be constituted in a suitable combination.

INDUSTRIAL APPLICABILITY

According to the caliper body and the disk brake described above, it is possible to improve the quality of a caliper body and a disk brake.

REFERENCE SIGNS LIST

1 Disk
10 Disk brake
20 Caliper body
21 Piston
80 Liquid pressure chamber
26 Cylinder portion
29, 30 Bleeder boss portion
31, 32 Pin attachment portion
33 Slide pin
34 Pin insertion hole
55 Pin boss portion (part)
111, 115 Marking surface (surface)
112, 116 Identifier
122 Bleeder hole

The invention claimed is:

1. A caliper body of a disk brake comprising:
    a cylinder portion that has a piston disposed therein and is internally provided with a liquid pressure chamber;
    a bleeder boss portion that communicates with the liquid pressure chamber and includes a bleeder hole configured to discharge air from the liquid pressure chamber; and
    a plurality of identifiers,
    wherein at least one identifier of the plurality of identifiers is formed in a region hidden by a bleeder plug attached to the bleeder boss portion.

2. The caliper body according to claim 1,
    wherein the bleeder boss portion is formed to protrude outward in a disk rotation direction from an inner side of the cylinder portion in a disk radial direction.

3. The caliper body according to claim 2, further comprising:
    a pair of pin attachment portions that protrude outward in the disk rotation direction from outer sides of the bleeder boss portions in the disk radial direction and in which a pin insertion hole is formed in a portion of an outer side of the pair of pin attachment portions in the disk rotation direction, the pin insertion hole into which a slide pin is inserted in a disk axial direction, wherein the identifiers are formed on surfaces on inner sides of the pair of pin attachment portions in the disk radial direction.

4. The caliper body according to claim 1,
wherein the identifiers are formed through casting.

5. The caliper body according to claim 1,
wherein the identifiers are formed on projection surfaces in a casting direction.

6. A disk brake comprising:
the caliper body according to claim 1.

7. The disk brake according to claim 6,
wherein the identifiers indicate attachment positions in a vehicle.

* * * * *